(12) United States Patent
Park et al.

(10) Patent No.: US 11,159,704 B2
(45) Date of Patent: Oct. 26, 2021

(54) CAMERA MODULE AND VEHICLE

(71) Applicant: LG INNOTEK CO., LTD., Seoul (KR)

(72) Inventors: Jong Hyun Park, Seoul (KR); Seong Deok Moon, Seoul (KR); Ok Hyeon Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/609,960

(22) PCT Filed: May 3, 2018

(86) PCT No.: PCT/KR2018/005132
§ 371 (c)(1),
(2) Date: Oct. 31, 2019

(87) PCT Pub. No.: WO2018/203677
PCT Pub. Date: Nov. 8, 2018

(65) Prior Publication Data
US 2020/0059580 A1 Feb. 20, 2020

(30) Foreign Application Priority Data

May 4, 2017 (KR) .......................... 10-2017-0056821

(51) Int. Cl.
*H04N 5/225* (2006.01)
*B60R 11/04* (2006.01)
(Continued)

(52) U.S. Cl.
CPC ............ *H04N 5/2254* (2013.01); *B60R 11/04* (2013.01); *G03B 17/12* (2013.01); *H02G 3/22* (2013.01);
(Continued)

(58) Field of Classification Search
CPC .. H04N 5/2254; H04N 5/2252; H04N 5/2257; G03B 17/00; B60R 11/04
See application file for complete search history.

(56) References Cited

U.S. PATENT DOCUMENTS

| | | | |
|---|---|---|---|
| 2010/0321497 A1* | 12/2010 | Onishi | ...................... B60R 1/10 348/148 |
| 2014/0148030 A1* | 5/2014 | Makimura | ......... H01R 13/5219 439/271 |
| 2014/0231132 A1* | 8/2014 | Watanabe | ............ H02G 15/013 174/650 |

FOREIGN PATENT DOCUMENTS

| | | |
|---|---|---|
| CN | 2869932 Y | 2/2007 |
| CN | 102593672 A | 7/2012 |

(Continued)

OTHER PUBLICATIONS

International Search Report in International Application No. PCT/KR2018/005132, filed May 3, 2018.
(Continued)

*Primary Examiner* — Kathleen V Nguyen
(74) *Attorney, Agent, or Firm* — Saliwanchik, Lloyd & Eisenschenk

(57) ABSTRACT

The present embodiment relates to a camera module and a vehicle comprising the camera module, the camera module comprising: a first exterior member comprising a lens holder; a lens module disposed in the lens holder; a second exterior member disposed at one side of the first exterior member; an electronic component part disposed inside the second exterior member; a cable electrically connected to the electronic component part; a cable accommodating part extending from the second exterior member toward the outside of the second exterior member; a closure comprising a first closure part disposed inside the cable accommodating part, and a second closure part extending from the first
(Continued)

closure part in the extension direction of the cable accommodating part and disposed at one side of the cable accommodating part; and a cap disposed at one side of the second exterior member, and accommodating the cable accommodating part and the closure, wherein the cable passes through the second exterior member, the closure and the cap from the electronic component part and extends toward the outside of the second exterior member.

17 Claims, 6 Drawing Sheets

(51) Int. Cl.
    *G03B 17/12*     (2021.01)
    *H02G 3/22*     (2006.01)
    *H04N 19/625*     (2014.01)
(52) U.S. Cl.
    CPC ......... *H04N 5/2257* (2013.01); *H04N 19/625* (2014.11)

(56) References Cited

FOREIGN PATENT DOCUMENTS

| | | | |
|---|---|---|---|
| CN | 102611838 A | | 7/2012 |
| EP | 1873871 | * | 6/2017 |
| JP | 2009-038438 A | | 2/2009 |
| JP | 2011-186360 A | | 9/2011 |
| KR | 20090040583 | * | 4/2009 |
| KR | 10-2012-0003036 A | | 1/2012 |
| KR | 20120003036 | * | 1/2012 |
| KR | 20-0471880 Y1 | | 3/2014 |
| KR | 10-1587257 B1 | | 1/2016 |
| KR | 10-2016-0015880 A | | 2/2016 |

OTHER PUBLICATIONS

Office Action dated Jan. 5, 2021 in Chinese Application No. 201880029666.6.

* cited by examiner

CAMERA MODULE AND VEHICLE

CROSS-REFERENCE TO RELATED APPLICATIONS

This application is the U.S. national stage application of International Patent Application No. PCT/KR2018/005132, filed May 3, 2018, which claims the benefit under 35 U.S.C. § 119 of Korean Application No. 10-2017-0056821, filed May 4, 2017, the disclosures of each of which are incorporated herein by reference in their entirety.

TECHNICAL FIELD

The present embodiment relates to a camera module and a vehicle.

BACKGROUND ART

The following description provides background information for the present exemplary embodiment and does not describe the prior art.

Camera modules that photograph a subject as a photo or movie can be combined with various devices and apparatuses. Particularly, due to the advancement and automation of vehicle parts, vehicles in which camera modules are combined are introduced to the market. The camera modules are used in the vehicles as being installed inside the front and rear surveillance cameras, a black box and the like.

In general, a camera module for a vehicle is combined with a first exterior member in the form of a cover and a second exterior member for accommodating an electronic component (substrate, image sensor, cable, etc.) to form an exterior appearance. The cable is a conductive line for electrically connecting the substrate and the external electronic device, and extends outward from the substrate through the second exterior member.

However, when the cable is drawn out, the airtightness of the second exterior member is deteriorated, and moisture, dust, and the like can invade into the camera module. Further, when the vehicle is running, the cable may be shaken and the electrical connection may be interrupted.

DETAILED DESCRIPTION OF THE INVENTION

Technical Subject

In the present embodiment, it is intended to provide a camera module capable of maintaining the airtightness of the interior and capable of fixing a cable and a motor vehicle equipped with such a camera module.

Technical Solution

A camera module of the present embodiment comprises: a first exterior member comprising a lens holder; a lens module disposed on the lens holder; a second exterior member disposed on one side of the first exterior member; an electronic component part disposed at an inner side of the second exterior member; a cable electrically connecting with the electronic component part; a cable accommodating part extending from the second exterior member toward an outer side of the second exterior member; a closure comprising a first closure part disposed at an inner side of the cable accommodating part, and a second closure part extending from the first closure part in an extension direction of the cable accommodating part and disposed on one side of the cable accommodating part; and a cap disposed on one side of the second exterior member, and accommodating the cable accommodating part and the closure, wherein the cable passes through the second exterior member, the closure and the cap from the electronic component part, and extends toward the outer side of the second exterior member.

The cable accommodating part and the first closure part are a hollow cylindrical shape and disposed coaxially with each other, wherein the first closure part comprises a plurality of rings spaced apart from each other in an axial direction, whose outer diameters are larger than an inner diameter of the cable accommodating part.

The cable accommodating part comprises a first inclined portion located on the end portion of the extension direction and outwardly inclined toward the extension direction, and wherein the second closure part comprises a second inclined portion extending in the extension direction of the cable accommodating part from the first closure part, and outwardly inclined toward the extension direction of the cable accommodating part, and wherein the first inclined portion and the second inclined portion are in contact with each other.

The second closure part further comprises a third inclined portion extending in the extension direction of the cable accommodating part from the second inclined portion and inwardly inclined toward the extension direction of the cable accommodating part, and wherein the cap comprises: a base, which is in contact with one side surface of the second exterior member, an intermediate part extending in the extension direction of the cable accommodating part from the base, and contacting an outer side surface of the cable accommodating part; a fourth inclined portion extending in the extension direction of the cable accommodating part from the intermediate part and inwardly inclined toward the extension direction of the cable accommodating part; and a penetrating surface through which the cable passes, and located on the end portion of the extension direction of the cable accommodating part from the fourth inclined portion, and wherein the third inclined portion and the fourth inclined portion are in contact with each other.

Wherein the inclination angle of the fourth inclined portion is larger than the inclination angle of the third inclined portion.

The intermediate part comprises a plurality of ribs are a hollow cylindrical shape, and spaced apart from each other in the circumferential direction, and connecting the outer circumferential surface of the intermediate part with the base.

The cable accommodating part further comprises a first threaded portion disposed on the outer side surface thereof, the intermediate part comprises a second threaded portion disposed on an inner side surface thereof, and the first threaded portion and the second threaded portion are screw-coupled together.

The electronic component part comprises: a substrate part on which an image sensor is disposed; and a connector electrically connecting the substrate part and the cable.

The closure is elastic.

A vehicle of the present embodiment comprises: a body; one or more doors mounted on the body; a display unit disposed in the body; and a camera module disposed on at least one of the body or one or more of the doors and electrically connecting with the display unit, wherein the camera module comprises: a first exterior member comprising a lens holder; a lens module disposed on the lens holder; a second exterior member disposed on one side of the first exterior member; an electronic component part disposed at an inner side of the second exterior member; a cable electrically connecting with the electronic component part; a cable accommodating part extending from the second exterior member toward an outer side of the second exterior member;

a closure comprising a first closure part disposed at an inner side of the cable accommodating part, and a second closure part extending from the first closure part in an extension direction of the cable accommodating part and disposed on one side of the cable accommodating part; and a cap disposed on one side of the second exterior member, and accommodating the cable accommodating part and the closure, wherein the cable passes through the second exterior member, the closure and the cap from the electronic component part, and extends toward outer side of the second exterior member.

ADVANTAGEOUS EFFECTS

In this embodiment, a closure is disposed in a cable accommodating part where the cable is drawing out to the outside, and the cable can be extended to the outside through the closure. Also, in this embodiment, the closure is divided into a first closure part disposed inside the cable accommodating part and a second closure part exposed outside the cable accommodating part, and is pressed by the cap. The first closure part is press-fitted into the cable accommodating part by the pressing action of the cap, thereby completely closing the cable accommodating part. Further, the second closure part can clamp the cable by the pressing action of the cap. As a result, airtightness can be maintained inside the camera module, and the cable can be stably fixed.

BEST MODE

Figure 1:
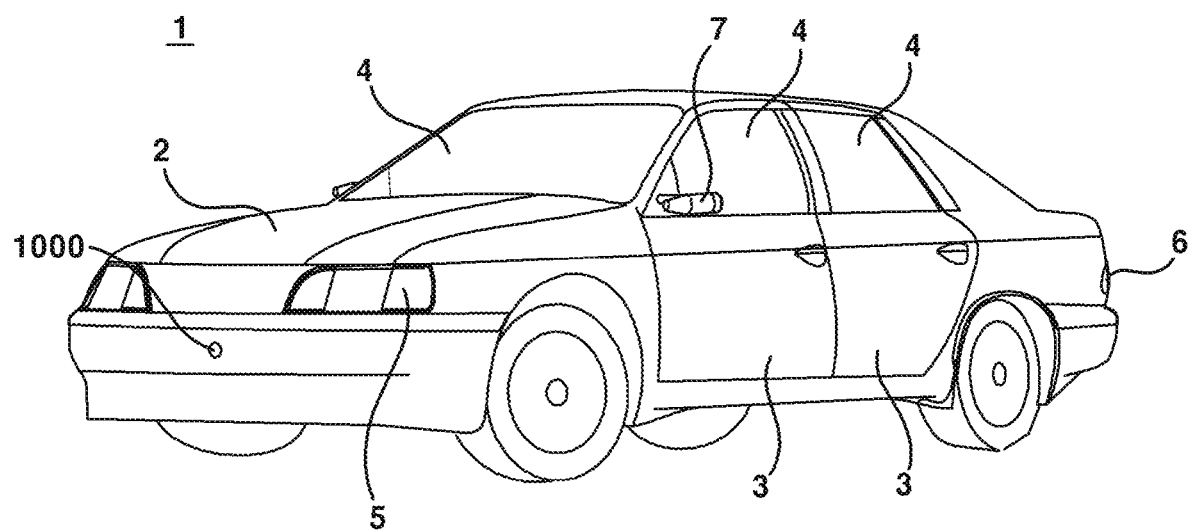
FIG. 1 is a perspective view of a vehicle of the present embodiment.

Hereinafter, some embodiments of the present invention will be described with reference to exemplary drawings. In describing the reference symbols of the components in the drawings, the same components are denoted by the same reference numerals whenever possible, even if they are shown on other drawings. In addition, in describing the embodiments of the present invention, when it is determined that the detailed description of the related well-known configuration or function interferes with the understanding of the embodiments of the present invention, the detailed description thereof will be omitted.

In describing the components of the embodiment of the present invention, terms such as first, second, A, B, (a), and (b) may be used. These terms are merely intended to distinguish the components from other components, and the terms do not limit the nature, order or sequence of the components. When a component is described as being "connected," "coupled," or "jointed" to another component, the component may be directly connected, coupled, or jointed to the other component, however, it should be understood that another element may be "connected," "coupled" or "jointed" between components.

Hereinafter, the "optical axis direction" shown in the drawing can be defined as "vertical direction" or "axial direction". In this case, the "optical axis" may mean the optical axis of the lens module 100.

Hereinafter, the automobile of the present embodiment will be described with reference to the drawings. FIG. 1 is a perspective view of an automobile according to the present embodiment.

A vehicle 1 of the present embodiment may comprise a body 2, a door 3, a glass 4, a head lamp 5, a tail lamp 6, a side mirror 7, and a camera module 1000.

The body 2 may be an exterior member of the vehicle 1. The body 2 may have various shapes such as a frame type, a monocoque type, and the like. One or more doors 3 can be coupled to the side surface of the body 2. In addition, the glass 4 can be coupled to the front and rear portions (the portion where the pillars are formed) and the door 3 of the upper portion of the body 2. The headlamp 5 may be mounted on the front of the body 2. The tail lamp 6 can be mounted on the rear of the body 2.

The headlamp 5 can illuminate the front of the vehicle 1. The head lamp 5 may be present on the right side and the left side of the vehicle 1, respectively. A rear lamp 6 can illuminate the rear of the vehicle 1. The rear lamp 6 may be present on the right side and the left side of the vehicle 1, respectively.

The camera module 1000 of the present embodiment can be mounted on the vehicle 1. Therefore, the camera module 1000 of the present embodiment can be referred to as a "vehicle camera".

The camera module 1000 may be installed on at least one of the side part of the body 2 or one or more of doors 3. That is, the camera module 1000 of the present embodiment can be installed at the front, rear, and side parts of the body 2 and the one or more of the door 3.

For example, the camera module 1000 may be installed at front parts (a grille, an emblem, a bumper, and the like) of the body 2, side parts (a side outer portion or a garnish, and the like) of the body 2, and rear parts (a trunk, an emblem, a garnish, a bumper, and the like) of the body 2.

The camera module 1000 may be installed in front of the glass 4 coupled to the door 3. Therefore, the side mirror 7 of the vehicle 1 can be replaced with the camera module 1000.

The camera module 1000 may be installed inside the vehicle 1. In this case, the camera module 1000 can perform a black box function for photographing the inside of the vehicle 1.

The camera module 1000 may be electrically connected to an electronic control unit (ECU). The camera module 1000 can be controlled by an electronic control unit. The camera module 1000 can be operated by receiving various driving signals, control signals, and power from the electronic control unit. The electronic control unit can receive an image signal from the camera module 1000 and convert it. The image photographed by the camera module 1000 may be controlled by an electronic control unit (ECU) and reproduced on the display unit.

The electronic control unit can be mounted as an electric component in the vehicle 1. However, the present invention is not limited to this, and the electronic control unit may exist in the camera module 1000 itself.

An interior space (room) for the driver may be formed in the interior of the vehicle 1. A display unit may be installed in the center fascia (not shown) in the vehicle 1. The display unit can output an image captured by the camera module 1000.

Figure 2:
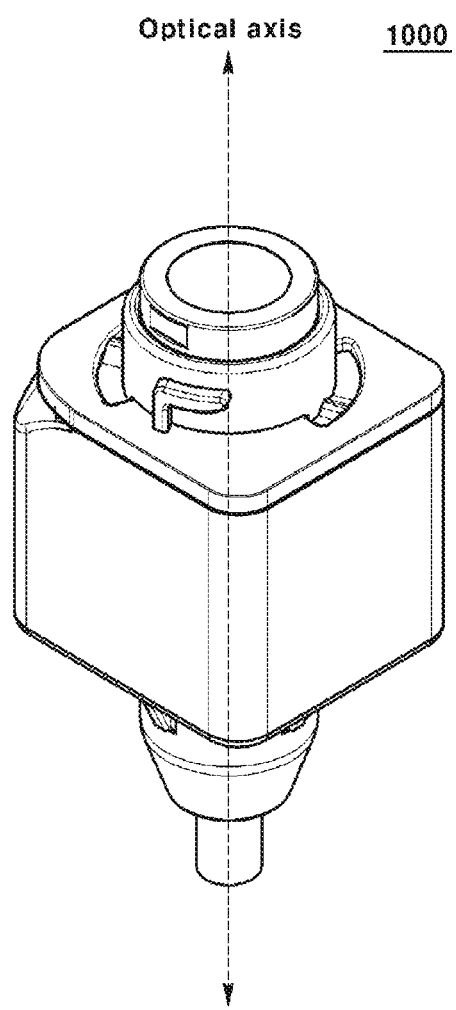
FIG. 2 is a perspective view of the camera module of the present embodiment.
Figure 3:
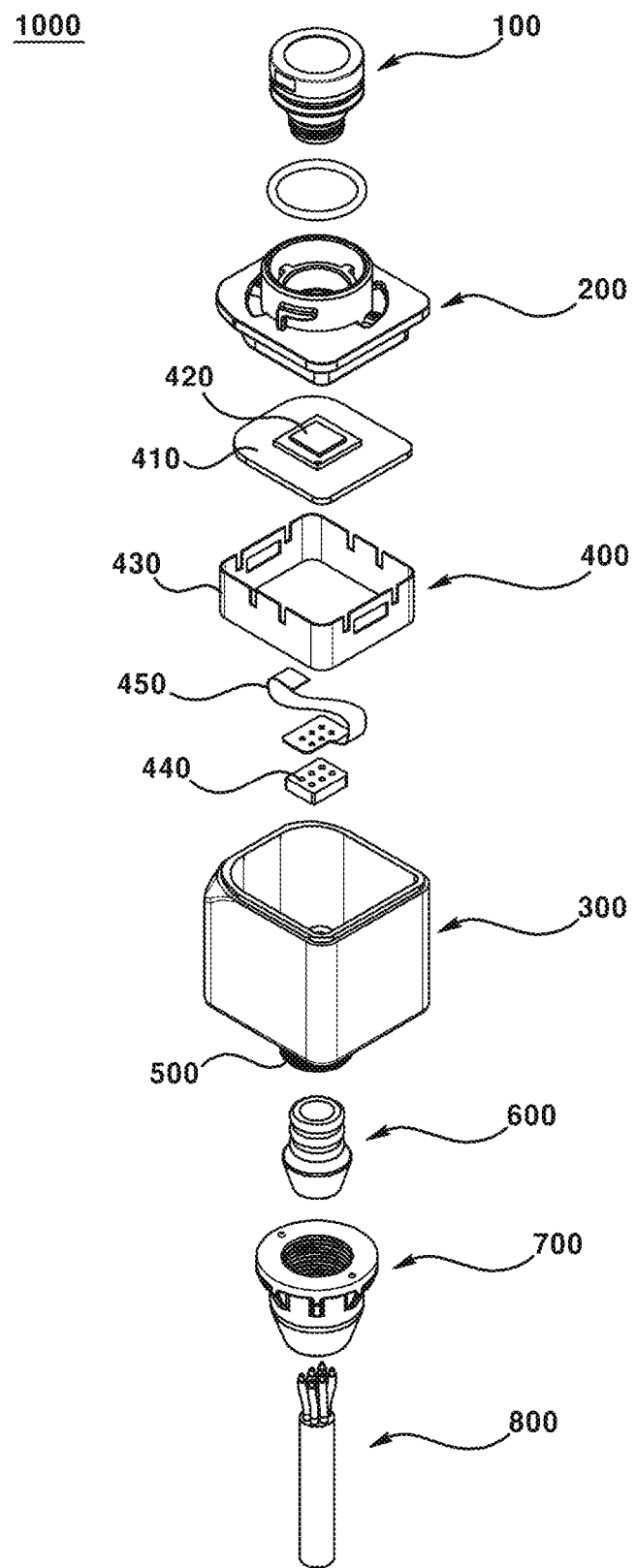
FIG. 3 is an exploded view of the camera module of the present embodiment.
Figure 4:
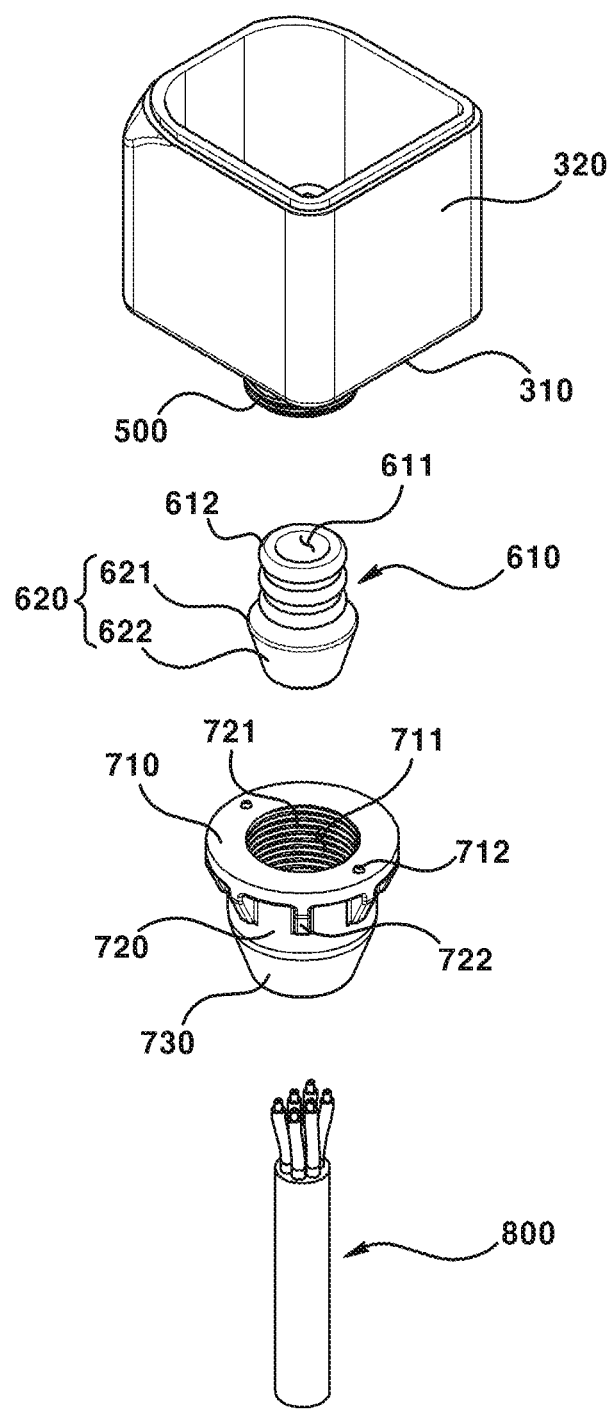
FIG. 4 is an exploded view of a second exterior member, a cable accommodating part, a closure, a cap, and a cable of the present embodiment.
Figure 5:
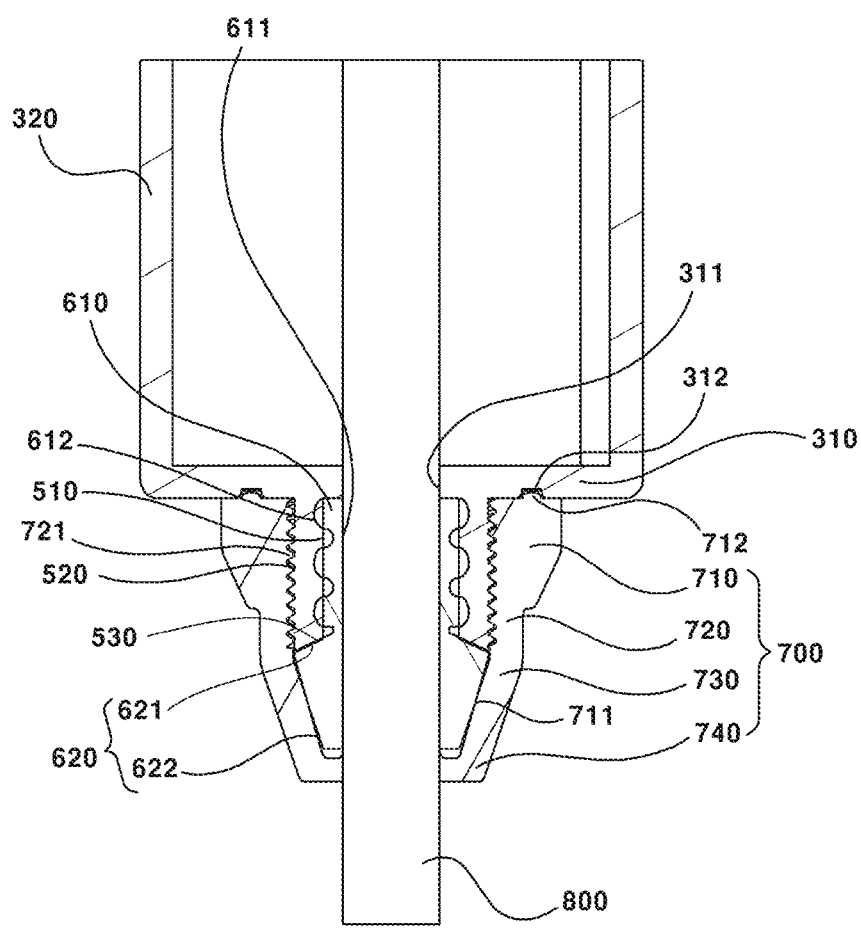
FIG. 5 is a vertical cross-sectional view of a second exterior member, a cable accommodating part, a closure, a cap, and a cable of the present embodiment.
Figure 6:
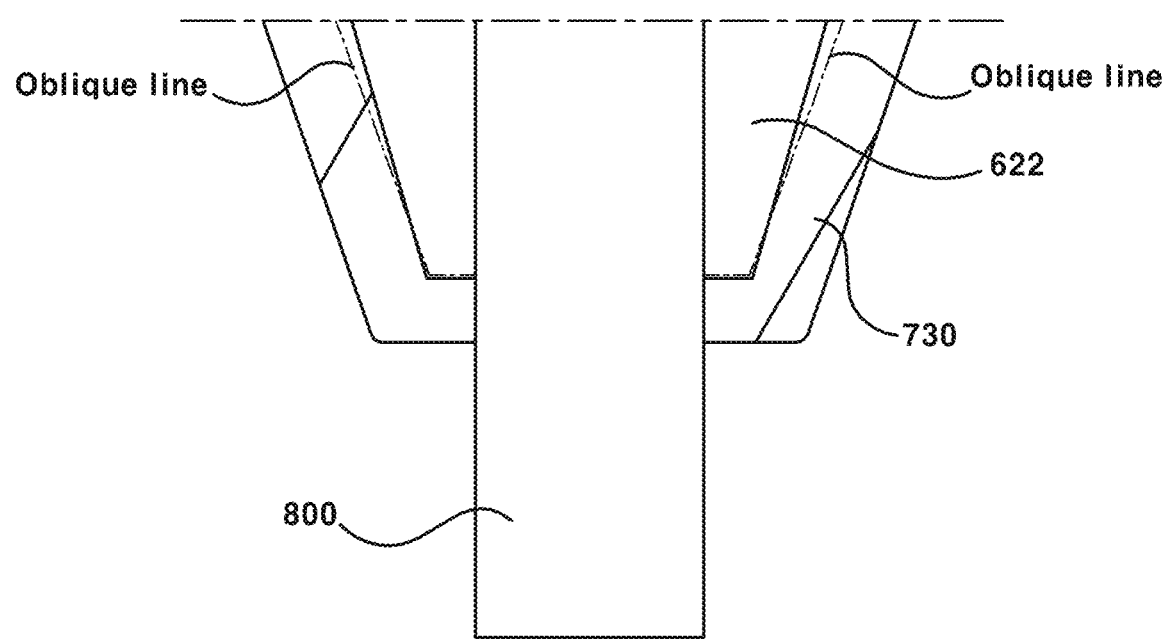
FIG. 6 is a vertical cross-sectional view showing that the second closure part of the present embodiment is pressed by the cap.

Hereinafter, the camera module 1000 of the present embodiment will be described with reference to the drawings. FIG. 2 is a perspective view of the camera module of the present embodiment; FIG. 3 is an exploded view of the camera module of the present embodiment; FIG. 4 is an exploded view of a second exterior member, a cable accommodating part, a closure, a cap, and a cable of the present embodiment; FIG. 5 is a vertical cross-sectional view of a second exterior member, a cable accommodating part, a closure, a cap and a cable in this embodiment; and FIG. 6 is a vertical cross-sectional view showing that the second closure part of the present embodiment is pressed by the cap.

The camera module 1000 of the present embodiment may comprise a lens module 100, a first exterior member 200, a second exterior member 300, an electronic component part 400, a cable accommodating part 500, a closure 600, a cap 700, and a cable 800.

Hereinafter, the lens module 100 of the present embodiment will be described with reference to FIGS. 2 and 3. The lens module 100 may be disposed on the first exterior member 200. The lens module 100 may be mounted on a lens holder 210 formed at the center of the first exterior member 200. The lens module 100 and the lens holder 210 can be screw-coupled in a state wherein an adhesive is applied or not. A gasket is interposed between the lens module 100 and the lens holder 210 to improve airtightness of the camera module 1000.

The lens module 100 may comprise one or more optical lenses. The plurality of optical lenses may be arranged in the vertical direction with their optical axes aligned. In this case, the lower surface of the lens disposed on the upper side and the upper surface of the lens disposed on the lower side can be facing to each other.

The plurality of optical lenses may be directly mounted on the lens holder 210, or may be accommodated in the lens barrel and mounted on the lens holder 210. The plurality of optical lenses and the lens barrel can be screw-coupled in a state wherein an adhesive is applied or not.

The lens disposed on the uppermost side of the lens module 100 may be exposed to the outside. The external light reflected on the subject can be incident on the uppermost lens of the lens module 100. External light may be transmitted through the lens module 100 and irradiated to an image sensor 420.

Hereinafter, the first exterior member 200 of the present embodiment will be described with reference to FIGS. 2 and 3. The first exterior member 200 may be an exterior member of the camera module 1000. The first exterior member 200 may comprise a plastic material. The first exterior member 200 may be made by plastic injection molding.

The first exterior member 200 may be disposed on the second exterior member 200. The first exterior member 200 may be joined to the second exterior member 300 by laser welding, screws, or the like.

The first exterior member 200 may cover the upper opening of the second exterior member 300 in the form of a cover. The closed interior space may be formed in the second exterior member 300 by the coupling of the first exterior member 200 and the second exterior member 300.

The first exterior member 200 may be a rectangular plate having a lens holder 210 at the center thereof and formed with an upper surface and a lower surface. The first exterior member 200 may comprise a lens holder 210. The lens holder 210 may have a hollow cylindrical shape extending in the vertical direction. The lens module 100 may be disposed inside the lens holder 210.

Hereinafter, the second exterior member 300 of the present embodiment will be described with reference to FIGS. 2, 3, and 4. The second exterior member 300 may be an exterior member of the camera module 1000. The second exterior member 300 may comprise a plastic material. The exterior member 300 may be made by plastic injection molding.

The second exterior member 300 may comprise a plate 310 having a rectangular shape and a side wall part 320 extending upwardly from the periphery (each of the edges) of the plate 310. The upper side of the second exterior member 300 may be open.

The second exterior member 300 may be disposed below the first exterior member 200. The second exterior member 300 may be coupled to the first exterior member 200 by laser welding, screws, or the like.

The upper opening of the second exterior member 300 can be closed by the first exterior member 200. The closed interior space may be formed in the second exterior member 300 by the coupling of the first exterior member 200 and the second exterior member 300.

An electronic component part 400 may be disposed inside the second exterior member 300. The second exterior member 300 can accommodate the electronic component part 400. A cable accommodating part 500 extending to the outside of the second exterior member 300 may be disposed on the second exterior member 300. The plate 310 may be provided with a cable accommodating part 500 extending downward from the outer surface of the plate 310. The second exterior member 300 and the cable accommodating part 500 may be integrally formed.

The second exterior member 300 may have a first hole 311 through which the cable 800 passes (penetrates). The plate 310 may have a first hole 311 through which the cable 800 passes (penetrates). The first hole 311 may be located inside the cable accommodating part 500. The first hole 311 may be surrounded by the cable accommodating part 500.

A locking groove 312 may be formed on one side surface (lower surface) of the second exterior member 300. And the locking groove 312 may be formed on the lower surface of the plate 310. The number of the locking groove 312 may be two. The two locking grooves 312 may be disposed symmetrically with respect to the central axis of the cable accommodating part 500. A locking protrusion 712 of the cap 700 can be accommodated in the locking groove 312. The cap 700 can be stably fixed to the second exterior member 300 by the locking protrusion 712 being accommodated in the locking groove 312.

Hereinafter, the electronic component part 400 of the present embodiment will be described with reference to FIG. 3. The electronic component part 400 may be disposed inside the second exterior member 300. The electronic component part 400 may be electrically connected to the cable 800. The electronic component part 400 may be electrically connected to an external electronic device (for example, a power supply device, an electronic control unit, a display part, and the like) through a cable 800. The electronic component part 400 can receive power, control signals, and the like from an external electronic devices. The electronic component part 400 can transmit a video signal to the external electronic device. The electronic component part 400 may comprise a substrate part 410, an image sensor 420, a shield can 430, a connector 440, and a connecting substrate 450.

The substrate part 410 may be one or more substrates. Hereinafter, a case where one substrate is used will be described, but the present embodiment is not limited thereto. That is, the substrate part 410 of the present embodiment also comprises a plurality of substrates. The substrate may be a printed circuit board (PCB). The substrate may be mounted on the shield can 430 in the form of a plate and accommodated in the interior of the second exterior member 300. An image sensor 420 may be disposed on the upper surface of the substrate.

The image sensor 420 may be mounted on the substrate part 410. The image sensor 420 may be arranged in alignment with the optical axis of the lens module 100. As a result, the light transmitted through the lens module 100 can be irradiated to the image sensor 420. The image sensor 420 can convert the obtained light into a video signal. The image signal output from the image sensor 420 may be transmitted to an external display unit through the cable 800. The video signal may be transmitted to the display unit via the electronic control unit. In this case, the electronic control unit can convert the video signal into a signal that can be reproduced in the display unit. The image sensor 420 may be a charge coupled device (CCD), a metal oxide semi-conductor (MOS), a CPD, and a CID. However, the type of the image sensor 420 is not limited thereto.

The shield can 430 may be made of a conductive metal. The shield can 430 may be in the form of a block having open top and bottom. A substrate part 420 may be mounted on the inside of the shield can 430. The shield can 430 may be disposed inside the second exterior member 300. The shield can 430 can be accommodated inside the second exterior member 300. In this case, the outer surface of the shield can 430 can contact the inner surface of the side wall part 320 of the second exterior member 300.

The shield can 430 can inhibit the electromagnetic generated from the outside from flowing into the substrate part 410. The shield can 430 can inhibit the electromagnetic generated in the substrate part 410 from being radiated to the outside. The shield can 430 may be electrically connected to the cable 800. The shield can 430 may be grounded to the cable 800. As a result, the external electromagnetic force can be stored in the shield can 430 and discharged through the cable 800, without flowing inside the shield can 430. In addition, the electromagnetic force of the substrate part 410 can be discharged through the cable 800 without being radiated to the outside of the shield can 430, but stored within the shield can 430.

The connector 440 can electrically connect the upper end of the cable 800 to the substrate part 410. In this case, the connector 440 may be formed with a plurality of openings in which a plurality of element wires of the cable 800 are disposed. The element wire at the upper end of the cable 800 can be stably fixed by the connector 440 and electrically connected to the substrate part 410.

The connecting substrate 450 may be a flexible printed circuit board (FPCB). The connecting substrate 450 may electrically connect the connector 440 and the substrate part 410. In this case, the lower end of the connecting substrate 450 can be mounted on the connector 440. The upper end of the connecting substrate 450 may be mounted on the lower surface of the substrate. The connecting substrate 450 may be omitted. In this case, the connector 440 can be directly mounted on the lower surface of the substrate.

If the substrate part 410 comprises a plurality of substrates, the plurality of substrates may be disposed so as to be stacked spaced apart in the vertical direction. In addition, the image sensor 420 may be mounted on the upper surface of the uppermost substrate, and the connector 440 or the connecting substrate 450 may be mounted on the lower surface of the lowermost substrate.

Hereinafter, the cable accommodating part 500 of the present embodiment will be described with reference to FIGS. 4, 5, and 6. The cable accommodating part 500 may be in the form of a hollow cylindrical shape extending from the second exterior member 300 toward the outside of the second exterior member 300. The cable accommodating part 500 may be shaped to extend downwardly from the plate 310. A second hole 510 may be formed at the center of the cable accommodating part 500 to vertically penetrate the cable accommodating part 500. The second hole 510 may be disposed coaxially with the first hole 311 of the second exterior member 300.

A first closure part 610 may be disposed inside the cable accommodating part 500. The first closure part 610 may be disposed in the second hole 510 of the cable accommodating part 500. The second hole 510 of the cable accommodating part 510 and the third hole 611 of the closure 600 may be coaxially disposed. The cable accommodating part 500 and the first closure part 610 may be coaxially disposed.

Hereinafter, the arrangement structure of the cable accommodating part 500 and the first closure part 610 will be described with reference to FIG. 5. The inner surface of the cable accommodating part 500 and the outer surface of the first closure part 610 can contact each other. The inner side surface of the cable accommodating part 500 and the outer side surfaces of the plurality of rings 612 of the first closure part 610 can contact each other. The inner diameter of the cable accommodating part 500 may be smaller than the outer diameter of the plurality of rings 612. The diameter of the second hole 510 may be smaller than the outer diameter of the plurality of rings 612.

The first closure part 610 is disposed inside the cable accommodating part 500 and can press the cable accommodating part 500 outward by the plurality of rings 612. That is, the inner surface of the cable accommodating part 500 and the outer surface of the first closure part 610 can be in close contact with each other. As a result, the second hole 510 of the cable accommodating part 500 can be completely closed by the first closure part 610.

A cap 700 may be disposed outside the cable accommodating part 500. The cable accommodating part 500 can be accommodated inside the cap 700. And it may be disposed coaxially with the second hole 510 of the cable accommodating part 500 and the fourth hole 711 of the cap 700.

Hereinafter, the arrangement structure of the cable accommodating part 500 and the cap 700 will be described with reference to FIG. 5. The outer surface of the cable accommodating part 500 can contact the inner surface of an intermediate part 720 of the cap 700. The cable accommodating part 700 may comprise a first thread portion 520 disposed in a three-dimensional spiral shape on the outer surface. The first thread portion 520 may be screw-coupled to a second thread portion 721 formed on the inner surface of the intermediate part 720 of the cap 700.

As the cable accommodating part 500 and the cap 700 are screw-coupled together, the cap 700 can move upward. In this case, the cap 700 can press the closure 600 to insert a first closure part 610 into the cable accommodating part 500.

As a result, the second hole 510 of the cable accommodating part 500 can be completely closed by the first closure part 610.

A second closure part 620 may be disposed on one side (lower side) of the cable accommodating part 500. The second hole 510 of the cable accommodating part 500 and a third hole 611 of the closure 600 may be disposed coaxially.

Hereinafter, the arrangement structure of the cable accommodating part 500 and the second closure part 620 will be described with reference to FIG. 5. The cable accommodating part 500 may comprise a first inclined portion 530 located at an end of the cable accommodating part 500 in the extended direction. The first inclined portion 530 may be inclined outward (radially outward) toward the extending direction (lower side) of the cable accommodating part 500. The first inclined portion 530 may be opposed to the second inclined portion 621 of the second closure part 620. The first inclined portion 530 can contact the second inclined portion 621. The inclination directions of a first inclined portion 530 and the second inclined portion 621 may be the same. When the closure 600 is pressed by the cap 700, the second closure part 620 is inserted into the cable accommodating part 500 as the second inclined portion 621 is guided by the first inclined portion 530. That is, the second inclined portion 621 can perform the function of inserting the first closure part 610 into the cable accommodating part 500.

The second hole 510 of the cable accommodating part 500 can be completely closed by the first closure part 610. Therefore, the camera module 1000 of the present embodiment can maintain airtightness.

Hereinafter, the closure 600 of the present embodiment will be described with reference to FIGS. 4, 5, and 6. The closure 600 may have elasticity. For example, the material of the closure 600 may be synthetic rubber. The closure 600 may have a hollow cylindrical shape having a different cross-sectional area in the vertical direction. A third hole 611 may be formed at the center of the closure 600 to penetrate the closure 600 in the vertical direction. The third hole 611 may be disposed coaxially with the second hole 510 of the cable accommodating part 500. A cable 800 may be disposed inside the cap 600.

In this case, the cable 800 can pass (penetrate) through the plug 600 through the third hole 611. The third hole 611 and the cable 800 may be disposed coaxially. The closure 600 may comprise a first closure part 610 and a second closure part 620.

The first closure part 610 may function to close the cable accommodating part 500 to maintain the airtightness inside the camera module 1000. The first closure part 610 may be disposed inside the cable accommodating part 500. The first closure part 610 may be in the form of a hollow cylindrical shape. The third hole 611 may be formed on the inner side of the first closure part 610 to vertically penetrate the first closure part 610. The first closure part 610 can accommodate the cable 800.

The upper surface of the closure part 610 may contact the plate 310 of the second exterior member 300. The outer surface of the first closure part 610 may be in contact with the inner surface of the cable accommodating part 500. The first closure part 610 may comprise a plurality of rings 612 spaced apart from each other in the axial direction (vertical direction) and the outer diameters thereof are larger than the inner diameter of the cable accommodating part 500. That is, the first closure part 610 may have the same shape as a bellows. The first closure part 610 can press the inner surface of the cable accommodating part 500 by the plurality of rings 612 to completely seal the inner surface.

The second closure part 620 is pressed by the cap 700 to guide the first closure part 610 into the inside (the second hole) of the cable accommodating part 500, and to clamp the cable 800 to secure it. clamping and fixing. The second closure part 620 may be disposed on one side (lower side) of the cable accommodating part 500. The second closure part 620 may be exposed to the outside of the cable accommodating part 500. The second closure part 620 may extend in a direction (lower direction) in which the cable accommodating part 600 extends in the first closure part 610. The second closure part 620 may have a cylindrical shape with different diameters in the vertical direction. The third hole 611 penetrating the second closure part 620 in the vertical direction may be formed on the inner side of the second closure part 620. The second closure part 620 can accommodate the cable 800. The second closure part 620 can be accommodated in the cap 700. The second closure part 620 may comprise a second inclined portion 621 and a third inclined portion 622.

The second inclined portion 621 may be in the form of a tapered tube having a third hole 611 formed at the center thereof The second inclined portion 621 may be disposed at one side (lower side) of the first inclined portion 530 of the cable accommodating part 500. The upper surface of the second inclined portion 621 can be faced with the lower surface of the first inclined portion 530. The second inclined portion 621 may contact the first inclined portion 530. The second inclined portion 621 extends in a direction in which the cable accommodating part 500 extends at one end of the first closure part 610 (in the direction in which the cable accommodating part extends), and can be inclined outward (radially outward) toward the extended direction of the cable accommodating part 500. Since the slope of the second inclined portion 621 and the first inclined portion 530 is the same, if the closure 600 is pressurized upward by the cap 700, the second inclined portion 621 may be guided along the first inclined portion 530. Such guide effect of the second inclined portion 621 can push the first closure part 610 to the inside of the cable accommodating part 500, thereby allowing the cable accommodating part 500 to be completely closed.

The third inclined portion 622 may be in the form of a tapered tube having a third hole 611 formed at the center thereof. A third inclined portion 622 may be disposed on one side (lower side) of the second inclined portion 621. The third inclined portion 622 extends in the direction in which the cable accommodating part 500 extends at one end of the second inclined portion 621 (in the direction in which the cable accommodating part extends) and the cable accommodating part 500 (radially inward) toward the extended direction (downward) of the cable accommodating part 500.

Hereinafter, the arrangement structure of the third inclined portion 622 and the cap 700 will be described with reference to FIGS. 5 and 6. The outer surface of the third inclined portion 622 may be disposed opposite to the inner surface of a fourth inclined portion 730 of the cap 700. The outer surface of the third inclined portion 622 can contact the inner surface of the fourth inclined portion 730.

The cap 700 presses the closure 600 upward and at least a part of the pressing force acts inwardly (radially inward) by the inclination direction of the third inclined portion 622 and the fourth inclined portion 730. As a result, the second closure part 620 can secure the cable 800 by clamping it as if it were grasping the cable 800.

The inclined direction of the third inclined portion 622 may be the same as the inclined direction of the fourth inclined portion 730, but the inwardly (radially inward) inclined angle of the third inclined portion 622 may be greater than the inwardly inclined angle of the fourth inclined portion 730. That is, the width of the upper portion of the third inclined portion 622 (see the oblique line) may be larger than the width of the upper portion of the cap 700. The third inclined portion 622 can be further urged inward (radially inward) as compared with the case where the inclination angles of the third inclined portion 622 and the fourth inclined portion 730 are the same. As a result, in the present embodiment, the fixing effect of the cable 800 can be increased.

Hereinafter, the cap 700 of the present embodiment will be described with reference to FIGS. 4, 5, and 6. The cap 700 may be disposed on one side (lower side) of the second exterior member 300. The cap 700 may be disposed on the lower surface of the plate 310. The cap 700 can accommodate the cable accommodating part 500 and the closure 600. The cap 700 may be in close contact with the closure 600 to press the closure 600. The cap 700 may comprise a base 710, an intermediate part 720, a fourth inclined portion 730, and a penetrating surface 740.

A fourth hole 711 penetrating through the cap 700 may be formed at the center of the cap 700 in a vertical direction. The fourth hole 711 may be formed through the base 710, the intermediate part 720, the fourth inclined portion 730, and the penetrating surface 740. Thus, the cap 700 may be hollow. The cross-sectional area of the fourth hole 711 may be getting smaller as it travels toward one side (lower side). The fourth hole 711 may be disposed coaxially with the third hole 611 of the closure 600.

The base 710 may be disposed in contact with the outer surface of the second exterior member 300 in the form of a flat plate. The upper surface of the base 710 and the lower surface of the plate 310 can contact each other. A locking protrusion 712 may be formed on the upper surface of the base 710. The locking protrusion 712 may be two. The two locking protrusions 712 may be disposed symmetrically with respect to the central axis of the fourth hole 711. Each of the two locking projections 712 can be accommodated in each of the two locking grooves 312. The cap 700 can be stably fixed to the second exterior member 300 by being accommodated in the locking groove 312 by the locking projection 712.

The intermediate part 720 may be in the form of a hollow cylinder. The intermediate part 720 may be disposed at one side of the base 710 (downward, in the direction in which the cable accommodating part is extended). The intermediate part 720 may extend in the direction in which the cable accommodating part 500 extends (one side, lower side) in the base 710. The cable accommodating portion 500 may be disposed inside the intermediate part 720. The cable accommodating part 500 may be disposed in the fourth hole 711 of the intermediate part 720.

The inner surface of the intermediate part 720 can contact the outer surface of the cable accommodating part 500. The intermediate part 720 is disposed on the inner side and may comprise a second threaded portion 721 in the form of a three-dimensional spiral. The second threaded portion 721 can be screw-coupled into the first threaded portion 620 of the cable accommodating part 600. The cap 700 moves upward according to the thread-coupling of the second threaded portion 721 and the first threaded portion 620 to press the closure 600.

The intermediate part 720 may comprise a plurality of ribs 722 spaced from each other in the circumferential direction and connecting the outer circumferential surface of the intermediate part 720 to the base 710. The plurality of ribs 722 may be in the shape of a right triangle in which two sides except the hypotenuse are in contact with the outer circumferential surface of the base 710 and the intermediate part 720, respectively. The plurality of ribs 722 support the intermediate part 720 to inhibit swinging.

The fourth inclined portion 730 may be in the form of a tapered tube having a fourth hole 711 formed at the center thereof. The fourth inclined portion 730 may be disposed at one side of the intermediate part 720 (downward, in the direction in which the cable accommodating part is extended). The fourth inclined portion 730 may extend in a direction in which the cable accommodating part 600 extends (one side, downward) at one end of the intermediate part 720 (downward, in the direction in which the cable accommodating part extends). The fourth inclined portion 730 may be inwardly inclined (radially inward) toward the direction (one side, lower side) in which the cable accommodating part 600 extends. The fourth inclined portion 730 can contact the third inclined portion 622 of the closure 600. The angle at which the fourth inclined portion 730 is inwardly inclined (inward in the radial direction) may be larger than the inwardly inclined angle of the third inclined portion 622.

When the cap 700 presses the closure 600 upward by the inclination direction of the fourth inclined portion 730, the fourth inclined portion 730 can press the third inclined portion 622 not only toward the upper side but also toward the inner side (radially inward side). As a result, the second closure part 620 can clamp the cable 800 as if it were held by a hand.

The penetrating surface 740 may be in the form of a flat plate having a fourth hole 711 formed at the center thereof. The penetrating surface 740 may be disposed at one end of the fourth inclined portion 730 (in a direction in which the cable accommodating part extends). The cable 800 may extend through the penetrating surface 740 and extend outside the second exterior member 300.

The cable 800 may be a conductive line that electrically connects the electronic component part 400 to an external electronic device (e.g., a power supply device, an electronic control unit, a display unit, and the like). The cable 800 can electrically connect the substrate of the substrate part 410 and an external electronic device.

The cable 800 may extend outside the second exterior member 300 by passing through the second exterior member 300, the closure 600 and the cap 700 in turn from the electronic component part 400. The cable 800 may sequentially pass through (penetrate through) the plate 310, the first closure part 610, the second closure part 620, and the penetrating surface 740 in the electronic component part 400, respectively, and be extended to the outside of the second exterior member 300. In this case, the cable 800 can pass (penetrate) through the first hole 311, the third hole 611, and the fourth hole 711 in order.

The upper end of the cable 800 may be mounted on a connector 440. The connector 440 may be mounted on the substrate of the substrate part 410 to electrically connect the cable 800 and the substrate of the substrate part 410. The connector 440 may be electrically connected to the substrate of the substrate part 410 by a connecting substrate 450 to electrically connect the cable 800 and the substrate of the substrate part 410.

The intermediate portion of the cable 800 may be disposed inside the closure 600 through the first hole 311. The cable 800 can be fixed by the second closure part 620 so as not to swing. The intermediate part of the cable 800 may extend through the fourth hole 711 to the outside of the second exterior member 300.

The lower end of the cable 800 may be electrically connected to an external electronic device (e.g., a power supply device, an electronic control unit, and a display unit). The camera module 1000 can receive power from the power source device through the cable 800. The camera module 1000 can receive an electronic control signal from the electronic control unit via the cable 800. The camera module 1000 can transmit the image signal output from the image sensor 420 to the display unit via the cable 800.

In the above, to have been described as all the components that make up the embodiments of the present invention may operate in combination, or combined into one, the present invention is not necessarily limited to all the components of the embodiments. That is, the present invention may comprise one or more of all the components of the embodiments and be operated through these components. In addition, the term "comprise" described above means that the corresponding components can be embedded unless there is an opposite description therefore it should be interpreted that other components may further be comprised in addition to those corresponding components. All terms, comprising technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary. The above description is only to those described as the technical idea of the present invention by way of example, and those skilled in the art will appreciate that various modifications and variations can be made without departing from the essential features of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. A camera module comprising:
a first exterior member comprising a lens holder;
a lens module disposed on the lens holder;
a second exterior member disposed on one side of the first exterior member;
an electronic component part disposed at an inner side of the second exterior member;
a cable electrically connecting with the electronic component part;
a cable accommodating part extending from the second exterior member toward an outer side of the second exterior member;
a closure comprising a first closure part disposed at an inner side of the cable accommodating part, and a second closure part extending from the first closure part in an extension direction of the cable accommodating part and disposed on one side of the cable accommodating part; and
a cap disposed on one side of the second exterior member, and accommodating the cable accommodating part and the closure;
wherein the cable passes through the second exterior member, the closure and the cap from the electronic component part and extends toward the outer side of the second exterior member;
wherein the cable accommodating part comprises a first inclined portion located at an end portion thereof and that is outwardly inclined with respect to the extension direction,
wherein the second closure part comprises a second inclined portion extending in the extension direction of the cable accommodating part from the first closure part and that is outwardly inclined with respect to the extension direction of the cable accommodating part, and a third inclined portion extending in the extension direction of the cable accommodating part from the second inclined portion and that is inwardly inclined with respect to the extension direction of the cable accommodating part,
wherein the cap comprises:
a base, which is in contact with one side surface of the second exterior member,
an intermediate part extending in the extension direction of the cable accommodating part from the base, and contacting an outer side surface of the cable accommodating part,
a fourth inclined portion extending in the extension direction of the cable accommodating part from the inteiiiiediate part and that is inwardly inclined with respect to the extension direction of the cable accommodating part, and
a penetrating surface through which the cable passes, located on the end portion of the cable accommodating part and corresponding to the fourth inclined portion, and
wherein the first inclined portion and the second inclined portion are in contact with each other, and the third inclined portion and the fourth inclined portion are in contact with each other.

2. The camera module of claim 1, wherein the cable accommodating part and the first closure part each has a hollow cylindrical shape and disposed coaxially with each other, and
wherein the first closure part comprises a plurality of rings spaced apart from each other in an axial direction, an outer diameter of any one of the plurality of rings is larger than an inner diameter of the cable accommodating part.

3. The camera module of claim 1, wherein an inclination angle of the fourth inclined portion is larger than an inclination angle of the third inclined portion.

4. The camera module of claim 1, wherein the cable accommodating part comprises a first threaded portion disposed on the outer side surface thereof, the intermediate part comprises a second threaded portion disposed on an inner side surface thereof, and the first threaded portion and the second threaded portion are screw-coupled together.

5. The camera module of claim 1, wherein the electronic component part comprises:
a substrate part on which an image sensor is disposed; and
a connector electrically connecting the substrate part and the cable.

6. The camera module of claim 1, wherein the closure is elastic.

7. The camera module of claim 1, wherein the second exterior member comprises a locking groove formed on a lower surface of the second exterior member,
wherein the base comprises a locking protrusion protruding from an upper surface of the base and formed at a position corresponding to the locking groove, and
wherein the locking protrusion is inserted into the locking groove.

8. The camera module of claim 1, wherein the second exterior member comprises a first hole through which the cable passes,
wherein the cable accommodating part comprises a second hole extending through the cable accommodating part in an optical axis direction and disposed coaxially with the first hole, and
wherein an inner diameter of the first hole is smaller than an inner diameter of the second hole.

9. The camera module of claim 1, wherein the intermediate part comprises a plurality of ribs each having a hollow cylindrical shape, spaced apart from each other in a circumferential direction, and connecting an outer circumferential surface of the intermediate part with the base.

10. The camera module of claim 9, wherein each rib of the plurality of ribs comprises a first surface extending downward from an outer side surface of the base, and a second surface connecting the first surface and the outer circumferential surface of the intermediate part, and
wherein the second surface is formed to be inclined downward with respect to the intermediate part.

11. The camera module of claim 10, wherein the closure comprises a third hole extending through the closure in an optical axis direction and disposed on at least a portion of the cable,
wherein the third hole disposed coaxially with the first hole, and
wherein an inner diameter of the third hole corresponds to an inner diameter of the first hole.

12. The camera module of claim 10, wherein the cap comprises a fourth hole extending through the cap in an optical axis direction and disposed coaxially with the first hole,
wherein the fourth hole of the cap comprises a first area formed on an area corresponding to the base and the intermediate part, and a second area extending downward from the first area and formed on an area corresponding to the fourth inclined portion, and a third area extending downward from the second area and formed on the penetrating surface, and
wherein an inner diameter of the third area of the fourth hole corresponds to an inner diameter of the first hole.

13. A vehicle comprising:
a body;
at least one door coupled with the body;
a display unit disposed in the body; and
the camera module of claim 1 disposed on at least one of the body or the at least one door and electrically connecting with the display unit.

14. A camera module comprising:
an exterior member comprising a cable accommodating part comprising a hole;
an electronic component part disposed in the exterior member;
a cable electrically connecting with the electronic component and passing through the hole of the cable accommodating part of the exterior member;
a closure comprising a first closure part disposed between the cable and the cable accommodating part of the exterior and a second closure part extending from the first closure part along an outer peripheral surface of the cable; and
a cap coupled with the cable accommodating part and contacted with an outer peripheral surface of the second closure part,
wherein at least a portion of the closure is pressed on the outer peripheral surface of the cable by the cap,
wherein the cable accommodating part comprises a first inclined portion located at an end portion thereof and that is outwardly inclined with respect to an extension direction of the cable accommodating part,
wherein the second closure part comprises a second inclined portion extending in the extension direction of the cable accommodating part from the first closure part and that is outwardly inclined with respect to the extension direction of the cable accommodating part, and a third inclined portion extending in the extension direction of the cable accommodating part from the second inclined portion and that is inwardly inclined with respect to the extension direction of the cable accommodating part,
wherein the cap comprises:
a base, which is in contact with one side surface of the exterior member,
an intermediate part extending in the extension direction of the cable accommodating part from the base. and contacting an outer side surface of the cable accommodating part;
a fourth inclined portion extending in the extension direction of the cable accommodating part from the intermediate part and that is inwardly inclined with respect to the extension direction of the cable accommodating part; and
a penetrating surface through which the cable passes, located on the end portion of the cable accommodating part and corresponding to the fourth inclined portion, and
wherein the first inclined portion and the second inclined portion are in contact with each other, and the third inclined portion and the fourth inclined portion are in contact with each other.

15. The camera module of claim 14, wherein the first closure part of the closure comprises a plurality of rings protruding from an outer peripheral surface of the first closure part of the closure and a plurality of grooves formed between adjacent rings of the plurality of rings, and
wherein at least a portion of the plurality of rings of the first closure part of the closure is in contact with an inner peripheral surface of the hole of the cable accommodating part of the exterior member.

16. The camera module of claim 14, wherein the cap comprises a hole,
wherein the cap comprises a thread formed on an inner peripheral surface of the hole of the cap,
wherein the cable accommodating part of the exterior member comprises a thread formed on an outer peripheral surface of the cable accommodating part and corresponding to the thread in the hole of the cap, and
wherein the cap is screw-coupled with the cable accommodating part.

17. The camera module of claim 14, wherein the cap comprises a protrusion protruding from an upper surface of the cap,
wherein the cable accommodating part of the exterior member comprises a groove formed on a lower surface of the cable accommodating part, and wherein the protrusion of the cap is inserted into the groove of the cable accommodating part.

* * * * *